UNITED STATES PATENT OFFICE.

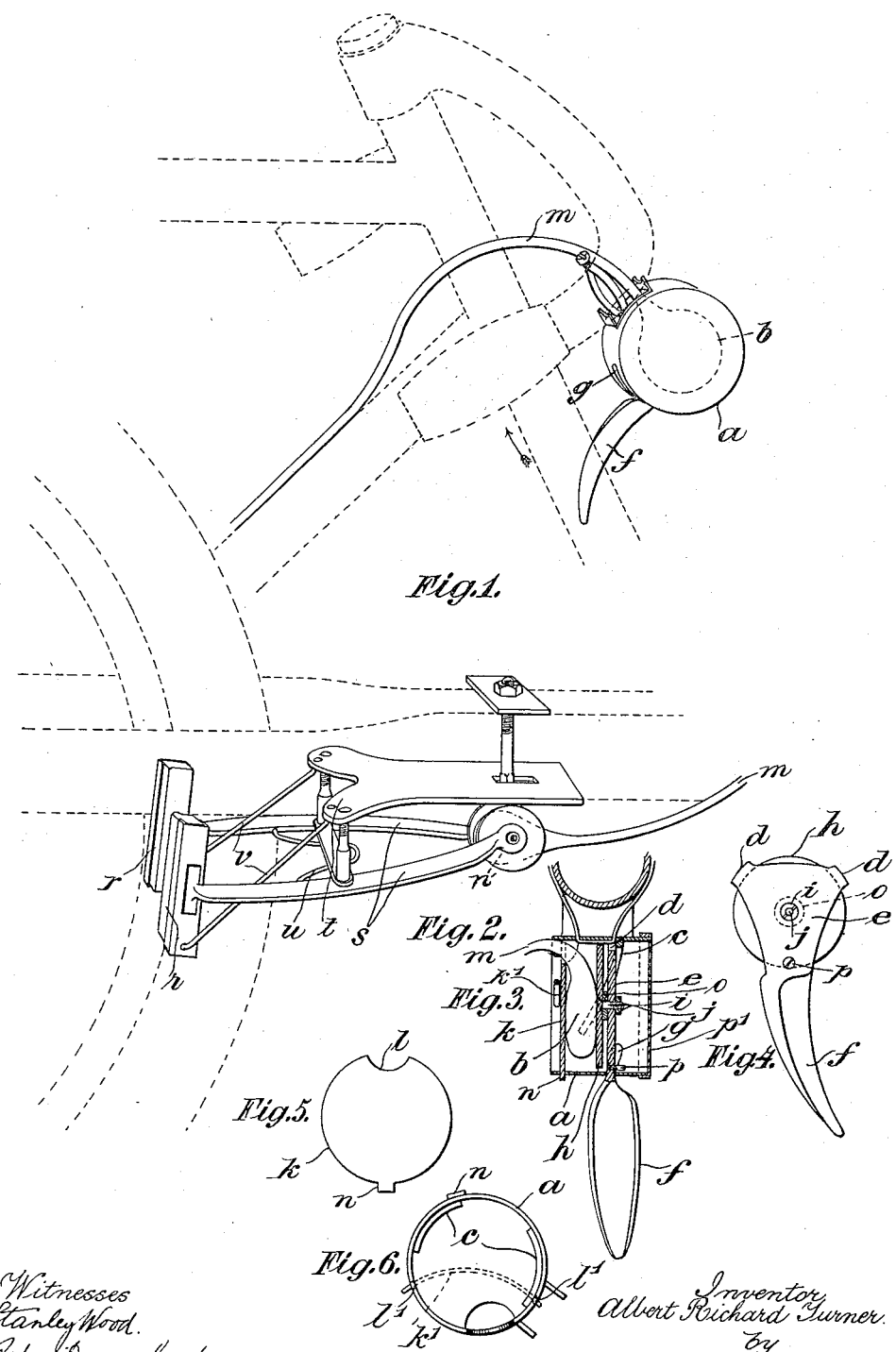

ALBERT RICHARD TURNER, OF LONDON, ENGLAND.

BRAKE FOR CYCLES, MOTOR-CARS, AND THE LIKE.

No. 869,948.      Specification of Letters Patent.      Patented Nov. 5, 1907.

Application filed October 25, 1906. Serial No. 340,526.

*To all whom it may concern:*

Be it known that I, ALBERT RICHARD TURNER, a subject of the King of Great Britain and Ireland, residing at 68 Heysham road, Stamford Hill, London, N., have invented certain new and useful Improvements Relating to Brakes for Cycles, Motor-Cars, and the Like, and for other Purposes, of which the following is a specification.

This invention relates to brakes for cycles motor cars and for other purposes, and has for its object to provide simple and reliable means for the transmission of pressure to the brake mechanism which shall involve a very slight effort on the operating part and which while being capable of producing small gradations of braking effect, shall be also capable of yielding a very powerful effect by an easy effort applied to the operating part.

According to the invention I employ an inextensible tube which is integrally provided at each end with a communicating bulb, the whole being filled with any suitable fluid. Operating mechanism is provided to effect the compression of one bulb, and brake mechanism is provided to operate upon the consequent expansion within it of the other bulb, so that thus the mechanical advantage of hydraulic transmission is secured without the disadvantage of joints liable to leakage.

The invention as applied to a cycle is illustrated in the accompanying drawings in which, Figure 1 is a perspective view of the compressor bulb in position upon the handle-bar. Fig. 2 is a perspective view of the expansion bulb in position between adjustable disks attached to the arms of the brake mechanism. Fig. 3 is a sectional view of the casing within which the compressor bulb is secured. Fig. 4 is an elevation of the brake handle and compressor plate employed in the construction illustrated in Figs. 1 and 3. Fig. 5 is a detail view of the fixed bottom plate of the compressor casing. Fig. 6 is a detail view of the casing with compressor plate removed.

In carrying out the invention according to a preferred construction and as illustrated in the accompanying drawings, I provide the casing $a$ within which the compressor bulb $b$ is situated of a substantially cylindrical form and I form upon the inner periphery thereof two or more helical projections $c$, which may be either integral with the casing $a$ or attached thereto, upon which helical projections $c$, projections $d$ formed upon a plate $e$ integral with the brake handle $f$ are adapted to ride. I further provide a helical slot $g$ of such a shape and so disposed with reference to the helical projections $c$ that the brake handle $f$ may move therein and the projections $d$ thereon fit under the projections $c$ upon the casing $a$. The plate $e$ formed on the extremity of the brake handle $f$ is secured to the compressor plate $h$ by means of a nut $i$ and bolt $j$.

The bottom plate $k$ of the compressor casing is removable and is provided with a recess $l$ for the reception of the transmission tube $m$ and a projection $n$ which fits into a slot in the casing.

It will be understood that in fitting together the compressor casing before attachment to the handle bar the plate $e$ is inserted through the slot $g$ and the compressor plate $h$ is then attached by means of the pivot screw $j$, a washer $o$ being preferably inserted between the plate $e$ and the plate $h$. A pin $p$ is screwed into the plate $e$ to prevent its withdrawal, and the cover $p'$ placed in position. The compressor bulb $b$ is then inserted and the bottom plate $k$ attached. A wire $k'$ is then passed through holes $l'$ in the compressor casing $c$ to maintain the bottom plate $k$ in position, one end of the wire being bent and so held between the compressor casing and the handle bar.

Any suitable means such as a spring clip may be provided to secure the casing in position upon the handle-bar. The compressor bulb is integrally connected to a transmission tube $m$ which is filled with any suitable fluid and is provided at the other end with an expansion bulb $n'$.

As to the brake mechanism this may conveniently consist of levers $s$ pivotally mounted on a plate $t$ fixedly attached as shown to the stays of the cycle between which arms the expansion bulb $n'$ is inserted, a spring $u$ being provided to return the brake blocks $r$ to their inoperative position on pressure being withdrawn from the compressor bulb. Wire stays $v$ take the principal forward pull when the brake is in operation.

An additional expansion bulb may be attached if desired simultaneously to operate a front brake mechanism; while for motor cycles and motor cars the expander bulb or bulbs can be arranged to operate band brakes.

What I claim as my invention and desire to secure by Letters Patent is:—

1. A brake for cycles and other vehicles consisting of a transmission tube containing fluid, an expansion bulb and a compressor bulb connected to the respective extremities of said transmission tube, means for compressing said compressor bulb consisting of a compressor casing within which said compressor bulb is secured, helical projections on the inner periphery of said compressor casing and a compressor plate adapted on rotation to ride on said projections brake blocks, and means for transmitting pressure from the expansion bulb to the brake blocks substantially as described.

2. A brake for cycles and the like consisting of a transmission tube containing fluid an expansion bulb and a compressor bulb attached to the respective extremities of said transmission tube means for compressing said compressor bulb consisting of a compressor casing within which said compressor bulb is secured, helical projections on the inner periphery of said compressor casing, a brake handle, a plate integral with said brake handle having projections adapted to ride on said projections on the rotation of said plate, brake blocks, and means for transmitting pressure from the expansion bulb to said brake blocks consisting of a plate and two levers fulcrumed upon a fixed part of the frame between which said expansion bulb is secured and to which said brake blocks are attached.

In testimony whereof I have hereunto signed my name to this specification in the presence of two subscribing witnesses.

ALBERT RICHARD TURNER.

Witnesses:
WILLIAM EDWARD EVANS,
H. D. JAMESON.